(12) United States Patent
Sanford et al.

(10) Patent No.: US 11,487,159 B2
(45) Date of Patent: Nov. 1, 2022

(54) BACKLIGHT FOR AN IMAGE FORMING DEVICE COMPRISING AN OPTICAL CAVITY FORMED BY OPPOSING COLD AND HOT MIRRORS

(71) Applicant: 3M INNOVATIVE PROPERTIES COMPANY, St. Paul, MN (US)

(72) Inventors: Quinn D. Sanford, Mosinee, WI (US); Matthew B. Johnson, Woodbury, MN (US); Ryan T. Fabick, Shoreview, MN (US); Nathaniel K. Naismith, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/419,901

(22) PCT Filed: Jan. 6, 2020

(86) PCT No.: PCT/IB2020/050055
§ 371 (c)(1),
(2) Date: Jul. 16, 2020

(87) PCT Pub. No.: WO2020/144553
PCT Pub. Date: Jul. 16, 2020

(65) Prior Publication Data
US 2022/0082889 A1    Mar. 17, 2022

Related U.S. Application Data

(60) Provisional application No. 62/789,179, filed on Jan. 7, 2019.

(51) Int. Cl.
*G02F 1/13357*    (2006.01)
*G02F 1/1335*    (2006.01)

(52) U.S. Cl.
CPC .... *G02F 1/133628* (2021.01); *G02F 1/13362* (2013.01); *G02F 1/133605* (2013.01); *G02F 1/133606* (2013.01); *G02F 1/133615* (2013.01)

(58) Field of Classification Search
CPC .................. G02F 1/133605; G02F 1/133628
See application file for complete search history.

(56) References Cited

U.S. PATENT DOCUMENTS 6,088,159 A    7/2000 Weber
6,626,562 B2 *    9/2003 Blanchard ......... G02F 1/133605
                                                    362/23.18

(Continued)

FOREIGN PATENT DOCUMENTS

WO    WO 1996-019347    6/1996

OTHER PUBLICATIONS

International Search Report for PCT International Application No. PCT/IB2020/050055, dated Apr. 29, 2020, 6 pages.

*Primary Examiner* — Julie A Bannan
(74) *Attorney, Agent, or Firm* — Jonathan L. Tolstedt (57) ABSTRACT

A backlight (100) for an image forming device (70) includes spaced-apart front and back optical reflectors (20, 10) defining an optical cavity (18) therebetween, and at least one light source (15) for emitting light into the optical cavity. The front optical reflector (20) is disposed between the image forming device and the back optical reflector (10). For substantially normally incident light and for non-overlapping first (e.g. visible light) and second (e.g. infrared) wavelength ranges, the front optical reflector (20) may transmit (80*c*) at least 70% of light (80*a*) for each wavelength in the first wavelength range, and may reflect (90*b*) at least 70% of light (90*a*) for each wavelength in the second wavelength range. The back optical reflector (10) may reflect (80*b***) at least 70% of light for each wavelength in the (Continued)

first wavelength range, and may transmit (90*c*) at least 70% of light (90*b*) for each wavelength in the second wavelength range. The light (80*a*, 90*a*) emitted by the at least one light source (15) has at least one wavelength in the first wavelength range and at least one wavelength in the second wavelength range.

19 Claims, 4 Drawing Sheets

(56) References Cited

U.S. PATENT DOCUMENTS

| | | | | |
|---|---|---|---|---|
| 6,697,195 | B2* | 2/2004 | Weber | G02B 5/26 |
| | | | | 359/359 |
| 7,281,835 | B2* | 10/2007 | Wu | G02B 6/007 |
| | | | | 362/293 |
| 8,523,419 | B2* | 9/2013 | Nevitt | F21V 7/04 |
| | | | | 362/613 |
| 2003/0067759 | A1 | 4/2003 | Blanchard | |
| 2003/0086271 | A1* | 5/2003 | Masuoka | F21V 29/505 |
| | | | | 362/345 |
| 2005/0275960 | A1* | 12/2005 | Wu | F21V 7/24 |
| | | | | 359/584 |
| 2006/0181900 | A1 | 8/2006 | Wu | |
| 2007/0041197 | A1* | 2/2007 | Saito | G03B 21/2066 |
| | | | | 362/296.07 |

\* cited by examiner

BACKLIGHT FOR AN IMAGE FORMING DEVICE COMPRISING AN OPTICAL CAVITY FORMED BY OPPOSING COLD AND HOT MIRRORS

CROSS REFERENCE TO RELATED APPLICATIONS

This application is a national stage filing under 35 U.S.C. 371 of PCT/IB2020/050055, filed Jan. 6, 2020, which claims the benefit of provisional Application No. 62/789179, filed Jan. 7, 2019, the disclosure of which is incorporated by reference in its/their entirety herein.

SUMMARY

In some aspects of the present description, a backlight for providing illumination to an image forming device is provided. In some embodiments, the backlight includes spaced-apart front and back optical reflectors defining an optical cavity therebetween, and at least one light source for emitting light into the optical cavity.

The front optical reflector may be configured to be disposed between the image forming device and the back optical reflector. For substantially normally incident light, and for each of orthogonal first and second polarization states, and for nonoverlapping first and second wavelength ranges, the front optical reflector may transmit at least 70% of light for each wavelength in the first wavelength range, and may reflect at least 70% of light for each wavelength in the second wavelength range. The back optical reflector may reflect at least 70% of light for each wavelength in the first wavelength range, and may transmit at least 70% of light for each wavelength in the second wavelength range. The emitted light may include at least one wavelength in the first wavelength range and at least one wavelength in the second wavelength range.

In some aspects of the present description, a display system is provided, including an image forming device disposed on a backlight. The backlight may include a light source, a front optical reflector disposed between the image forming device and a back optical reflector, and a thermal management layer disposed on the back optical reflector away from the front optical reflector.

In some embodiments, the front optical reflector may substantially transmit visible light emitted by the light source toward the image forming device, and may substantially reflect heat generated by the light source toward the back optical reflector. In some embodiments, the back optical reflector may substantially reflect visible light emitted by the light source toward the front optical reflector, and may substantially transmit heat reflected by the front optical reflector, such that the thermal management layer substantially absorbs heat transmitted by the back optical reflector.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Ultra High Definition (UHD), High Dynamic Range (HDR) displays are requiring an unprecedented amount of brightness and power consumption due to standards in picture quality, inefficiencies in display panels, nearly instantaneous picture and data processing, and the sheer size of these displays and the number of light sources. Multilayer optical film technology can allow specific portions of the electromagnetic spectrum to be managed within the display, providing optimum picture quality and reduced thermal load on the system. These UHD, HDR systems demand high brightness, visible light directed substantially toward the viewer, and near infrared energy (i.e., heat) to be directed to locations where the heat can be properly managed (e.g., dissipated through heat sinks). Typical light sources used with UHD, HDR systems emit human-visible light in the range from about 400 nm to about 750 nm. Some systems with higher color gamuts emit wavelengths of light centered around the color blue, or about 450 nm. Both types of light sources also emit energy in the infrared band, which can add unwanted heat to the system.

According to some aspects of the present description, a backlight for providing illumination to an image forming device is provided. In some embodiments, the backlight includes spaced-apart front and back optical reflectors defining an optical cavity therebetween, and at least one light source for emitting light into the optical cavity. The front optical reflector may be configured to be disposed between the image forming device and the back optical reflector.

For substantially normally incident light, and for each of orthogonal first and second polarization states, and for nonoverlapping first and second wavelength ranges, the front optical reflector may transmit at least 70% of light for each wavelength in the first wavelength range, and may reflect at least 70% of light for each wavelength in the second wavelength range. The back optical reflector may reflect at least 70% of light for each wavelength in the first wavelength range, and may transmit at least 70% of light for each wavelength in the second wavelength range. The emitted light may include at least one wavelength in the first wavelength range and at least one wavelength in the second wavelength range.

In some embodiments, the front and back optical reflectors include a band edge separating the first wavelength range from the second wavelength range, such that the band edges are within 50 nm of each other. In other embodiments, the band edges are within 40 nm of each other, or within 30 nm of each other. In still other embodiments, the first and second wavelength ranges are less than about 10 nm apart.

In some embodiments, the first wavelength range extends from about 400 nm to about 600 nm, or from about 400 nm to about 700 nm, or from about 400 nm to about 750 nm, or from about 400 nm to about 800 nm. In some embodiments, the second wavelength range extends from about 700 nm to about 800 nm, or from about 700 nm to about 850 nm. In some embodiments, the second wavelength range extends from about 700 nm to about 1.7 microns.

In some embodiments, one or both of the front optical reflector and the back optical reflector may be multilayer optical films, constructed of a plurality of alternating layers of first and second polymeric layers numbering between 50 and 1000, with each of the first and second polymeric layers having an average thickness less than about 500 nm. By selecting the appropriate layer pairs with appropriate refractive indices, layer thickness, and/or the number of layer pairs for each reflector, the multilayer optical films can be designed to transmit or reflect desired wavelengths of light. By selecting polymers with specific indices of refraction, as well as controlling the number of pairs of alternating polymer layers, it is possible to create an optical reflector which will transmit wavelengths of light in a first set of wavelengths (e.g., corresponding to the first wavelength range), and reflect light in a second set of wavelengths (e.g., corresponding to the second wavelength range.)

For example, in an embodiment of the first optical reflector, the first and second polymeric layers may have respective indices of refraction nx1 and nx2 along the first polarization state, ny1 and ny2 along the second polarization state, and nz1 and nz2 along a z-axis orthogonal to the first and second polarization states, such that for at least one wavelength in the first wavelength range:

First polymeric layer:
  nx1 is between about 1.60 and about 1.70 (e.g., about 1.655)
  ny1 is between about 1.60 and about 1.70 (e.g., about 1.655)
  nz1 is between about 1.45 and about 1.55 (e.g., about 1.498)
Second polymeric layer:
  nx2 is between about 1.45 and about 1.55 (e.g., about 1.491)
  ny2 is between about 1.45 and about 1.55 (e.g., about 1.491)
  nz2 is between about 1.45 and about 1.55 (e.g., about 1.491)

In another example, in an embodiment of the back optical reflector, the first and second polymeric layers may have respective indices of refraction nx1 and nx2 along the first polarization state, ny1 and ny2 along the second polarization state, and nz1 and nz2 along a z-axis orthogonal to the first and second polarization states, such that for at least one wavelength in the first wavelength range:

First polymeric layer:
  nx1 is between about 1.62 and about 1.80 (e.g., about 1.75)
  ny1 is between about 1.62 and about 1.80 (e.g., about 1.75)
  nz1 is between about 1.41 and about 1.55 (e.g., about 1.498)
Second polymeric layer:
  nx2 is between about 1.41 and about 1.55 (e.g., about 1.491)
  ny2 is between about 1.41 and about 1.55 (e.g., about 1.491)
  nz2 is between about 1.41 and about 1.55 (e.g., about 1.491)

The indices of refraction shown above are examples only, and any appropriate values for the indices may be used to achieve the expected functionality of an optical reflector as best suited for a specific application. The examples provided are not limiting in any way. Example materials for the first polymeric layer may be crystalline materials, including, but not be limited to, polyethylene terephthalate (PET), crystalline polyethylene terephthalate (coPET), polyethylene naphthalate (PEN) or crystalline polyethylene naphthalate (coPEN). Example materials for the second polymeric layer may be substantially non-crystalline materials, including, but not be limited to, non-crystalline polyethylene terephthalate (coPET), poly(methyl methacrylate) (PMMA) and poly(methyl methacrylate) (coPMMA), as well as blends with fluorine such as polyvinylidene difluoride (PVDF) or THV (terpolymer of tetrafluoroethylene, hexafluoropropylene, and vinylidene fluoride).

In some embodiments, the backlight may also include a reflective polarizer disposed on the front optical reflector outside the optical cavity, such that for substantially normally incident light and for each wavelength in the first wavelength range, the reflective polarizer reflects at least 70% of light having the first polarization state and transmits at least 70% of light having the second polarization state. In some embodiments, the reflective polarizer may include a plurality of alternating first and second polymeric layers numbering between 50 and 1000, with each of the first and second polymeric layers having an average thickness less than about 500 nm. For example, in an embodiment of the reflective polarizer, the first and second polymeric layers may have respective indices of refraction nx1 and nx2 along the first polarization state, ny1 and ny2 along the second polarization state, and nz1 and nz2 along a z-axis orthogonal to the first and second polarization states, such that for at least one wavelength in the first wavelength range:

First polymeric layer:
  nx1 is between about 1.75 and about 1.85 (e.g., about 1.810)
  ny1 is between about 1.50 and about 1.64 (e.g., about 1.574)
  nz1 is between about 1.50 and about 1.64 (e.g., about 1.570)
Second polymeric layer:
  nx2 is between about 1.50 and about 1.64 (e.g., about 1.574)
  ny2 is between about 1.50 and about 1.64 (e.g., about 1.565)
  nz2 is between about 1.50 and about 1.64 (e.g., about 1.565)

For example, these values may be seen at a wavelength of approximately 632 nm, where x is the direction of film stretching for the reflective polarizer (i.e., substantially uniaxial film stretching). For mirror films, the direction of stretch is in both the x and y directions (in-plane) (i.e., substantially biaxial film stretching).

In some embodiments, the light source may include any appropriate light source, including, but not limited to, light-emitting diodes (LEDs), lasers, or combinations thereof. In some embodiments, the light source may be disposed between the front and back optical reflectors within the optical cavity. In some embodiments, the light source may be disposed closer to the back optical reflector and farther from the front optical reflector. In some embodiments, the light source may be disposed outside, and along a side edge, of the optical cavity.

In some embodiments, the optical cavity is a substantially hollow air-filled cavity. In other embodiments, the optical cavity is substantially a solid volume (e.g., a filled cavity, or a solid material) comprising opposing top and bottom major surfaces, where the front optical reflector is disposed on the top major surface, and the back optical reflector is disposed on the bottom major surface. For example, in some embodiments, the optical cavity may be a solid light guide to distribute light received from light sources which are disposed outside of the optical cavity, through total internal reflection.

In some embodiments, the backlight may also include an optical diffuser disposed on the front optical reflector outside the optical cavity, the optical diffuser diffusing light exiting the optical cavity though the front optical reflector. In some embodiments, the backlight may also include one or more multilayer optical films designed to enhance the brightness of the light output from the backlight. Examples of such films include brightness enhancement films designed to collimate the output light in one or more dimensions, and reflective polarizers which can polarize the light so that it can be transmitted through a display such as a liquid crystal panel.

In some embodiments, the backlight may include a thermal management layer disposed on the back optical reflector outside the optical cavity. This thermal management layer may include one or more of an infrared absorption layer, a thermally conductive layer, or combinations thereof (e.g., a single layer which is both thermally conductive and infrared absorbing. In some embodiments, the thermal management layer may absorb at least 50% of light having a wavelength in the second wavelength range and transmitted by the back optical reflector (e.g., wavelengths corresponding to radiated heat energy). In some embodiments, the thermal management layer may have a thermal conductivity greater than at least 100 W/mK. In some embodiments, the thermal management layer may be or include a heat-spreading multilayer film. Example thermally conductive materials for the thermal management layer may include, but are not limited to, graphite, graphite foil, copper, and silver nanowire. In some embodiments, the backlight may also include a heat sink disposed on the thermal management layer (e.g., aluminum fins to dissipate heat).

In some embodiments, the thermal management layer may absorb at least a portion (e.g., at least 5%) of light/energy having at least one wavelength greater than the second wavelength range. For example, under one commonly used subdivision scheme, infrared energy may be subdivided into near infrared (about 750 nm to about 1400 nm), short-wavelength infrared (about 1400 nm to 3 microns), mid-wavelength infrared (about 3 microns to about 8 microns), long-wavelength infrared (from about 8 microns to about 15 microns), and far infrared (from about 15 microns to about 1000 microns). In some embodiments, the second wavelength range may extend over a portion of the near infrared spectrum, while the thermal management layer may absorb additional wavelengths of light/energy in a third wavelength range, the third wavelength range including wavelengths greater than wavelengths in the second wavelength range (i.e., at least one wavelength greater than the second wavelength range). For example, in one embodiment, the third wavelength range may include wavelengths in the short-wavelength, mid-wavelength, and long-wavelength ranges, as defined herein (e.g., from about 1.5 microns to at least about 15 microns).

In some embodiments, energy in this third wavelength range may be emitted by the at least one light source, emitted by electronic circuitry disposed adjacent to or within the backlight, or from other sources within the optical cavity. In some embodiments, the third wavelength range is at least about 200 nm wide. In some embodiments, the back optical reflector may transmit at least 10% of at least one wavelength in the third wavelength range.

According to some aspects of the present description, a display system may include an image forming device (e.g., a liquid crystal display panel) disposed on a backlight. The backlight may include a light source (e.g., one or more LEDs), a front optical reflector disposed between the image forming device and a back optical reflector, and a thermal management layer disposed on the back optical reflector away from the front optical reflector.

In some embodiments, the front optical reflector may substantially transmit visible light (i.e., light with a wavelength in a range visible to human eyes) emitted by the light source toward the image forming device, and may substantially reflect heat (i.e., light in the infrared range) generated by the light source toward the back optical reflector. In some embodiments, the back optical reflector may substantially reflect visible light emitted by the light source toward the front optical reflector, and may substantially transmit heat reflected by the front optical reflector, such that the thermal management layer substantially absorbs heat transmitted by the back optical reflector. In some embodiments, a heat sink may be disposed on or near the thermal management layer to aid in the dissipation of heat emitted by the light source.

Figure 1:
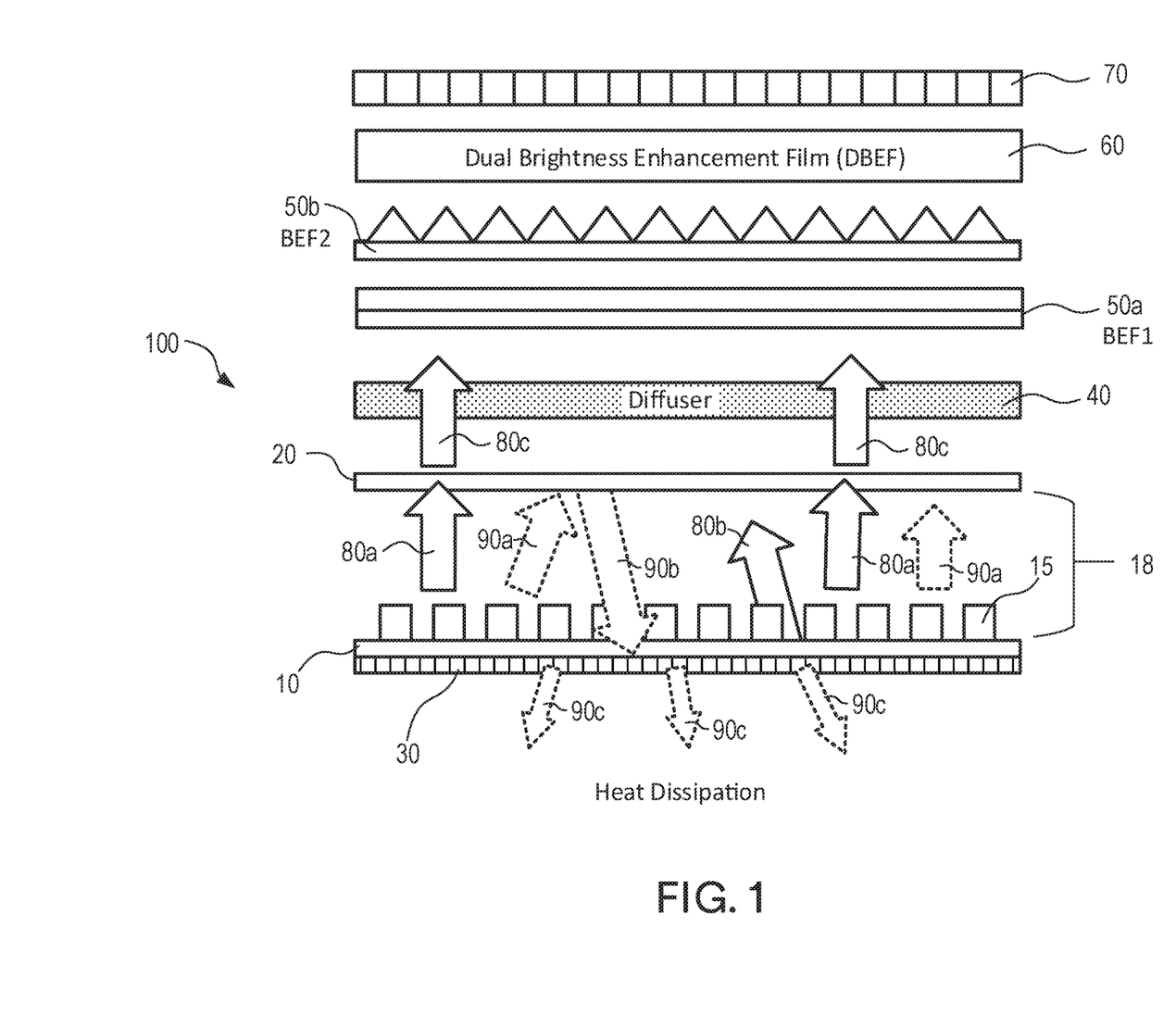
FIG. 1 is a cross-sectional view of a thermal management system, in accordance with an embodiment described herein.

Turning now to the figures, FIG. 1 is a cross-sectional view of a thermal management system for a backlight 100, in accordance with an embodiment described herein. A backlight 100 includes spaced-apart front optical reflector 20 and back optical reflectors 10 defining an optical cavity 18 therebetween, and at least one light source 15 for emitting light into optical cavity 18. In some embodiments, the front optical reflector 20 is configured to be disposed between an image forming device 70 and the back optical reflector 10. The image forming device 70 may be, for example, a liquid crystal panel.

In some embodiments, an optical diffuser 40 may be disposed on the outside of the front optical reflector 20, opposite the optical cavity 18. The optical diffuser 40 may diffuse any light exiting the optical cavity 18 though the front optical reflector 20. In some embodiments, one or more layers of optical enhancement layers may also be present between the front optical reflector 20 and the image forming device 70. In the embodiment shown in FIG. 1, a first brightness enhancement film 50a is disposed above diffuser 40, and a second brightness enhancement film 50b may be disposed above brightness enhancement film 50a. In some embodiments, a brightness enhancement film 50a/50b may be used to compress the output light toward an "on-axis" viewer. Placing two such layers of brightness enhancement film (such as 50a and 50b) together, rotated at 90 degrees to each other, can allow the light transmitted by the front optical reflector 20 to be compressed in two separate, orthogonal dimensions, substantially collimating the light before it reaches the image forming device 70. In some embodiments, a reflective polarizing enhancement film 60 (e.g., 3M Dual Brightness Enhancement Film) may be used to further enhance the output light (e.g., changing the polarization of the transmitted light to more efficiently pass through the image forming device 70).

During operation, light sources 15 emit light which may contain wavelengths of light 80 that are visible to humans, as well as infrared energy 90, which to not contribute to human-visible light but which represent heat which can contribute to heat radiating from the front of the device. In FIG. 1, light sources 15 emit human-visible light 80a and infrared energy 90a. The human-visible light 80a and infrared energy 90a may be emitted in various directions inside optical cavity 18. It should be noted that the arrows shown in FIG. 1 and other figures herein are illustrative and meant to show general movement of light throughout the backlight cavity. Human-visible light 80a and infrared energy 90a eventually become incident on front optical reflector 20. In some embodiments, front optical reflector 20 transmits (allows to pass) a substantial portion of human-visible light 80a (which becomes transmitted human-visible light 80c), and reflects a substantial portion of infrared energy 90a (which becomes reflected infrared energy 90b).

Reflected infrared energy 90b could become trapped within optical cavity 18, causing undesirable heating of backlight 100. Therefore, in some embodiments, back optical reflector 10 may be designed to transmit (allow to pass) a substantial portion of reflected infrared energy (which becomes transmitted infrared energy 90c), and reflect a substantial portion of human-visible light (including emitted human-visible light 80a and any portion of human-visible light 80 which was not initially transmitted by front optical reflector 20). Reflected human-visible light 80b may be reflected throughout optical cavity 18 (i.e., the light is recycled) until it is again incident on front optical reflector 20 and can be substantially allowed to pass as transmitted human-visible light 80c.

In some embodiments, thermal management layer 30 may be disposed on a side of back optical reflector 10. This thermal management layer 30 may be designed to absorb and/or dissipate transmitted infrared energy 90c, thereby removing unwanted heat from the backlight system 100. In some embodiments, the thermal management layer may be an infrared absorptive layer which absorbs at least a portion (e.g., at least 50%) of light/energy having a wavelength in the second wavelength range (e.g., infrared energy which can cause excess heat) and transmitted by the back optical reflector 10. In some embodiments, the thermal management layer 30 may include a thermally conductive layer in addition to and disposed adjacent to the infrared absorptive layer for conducting heat generated as a result of infrared energy absorbed by the infrared absorptive layer. In some embodiments, heat may be generated by the light sources 15, emitted by electronic circuitry near or within the backlight 100, or from other sources within the backlight 100. In some embodiments, the thermal management layer 30 may include only a thermally conductive layer, which pulls heat away from the backlight 100 such that it can be dissipated, absorbed, or otherwise mitigated. In some embodiments, a heat sink (not shown) may be disposed on or near the thermal management layer 30 to aid in the removal of heat from backlight 100. In some embodiments, the heat sink may be directly coated with an infrared absorptive layer to remove heat from the backlight 100.

Figure 2:
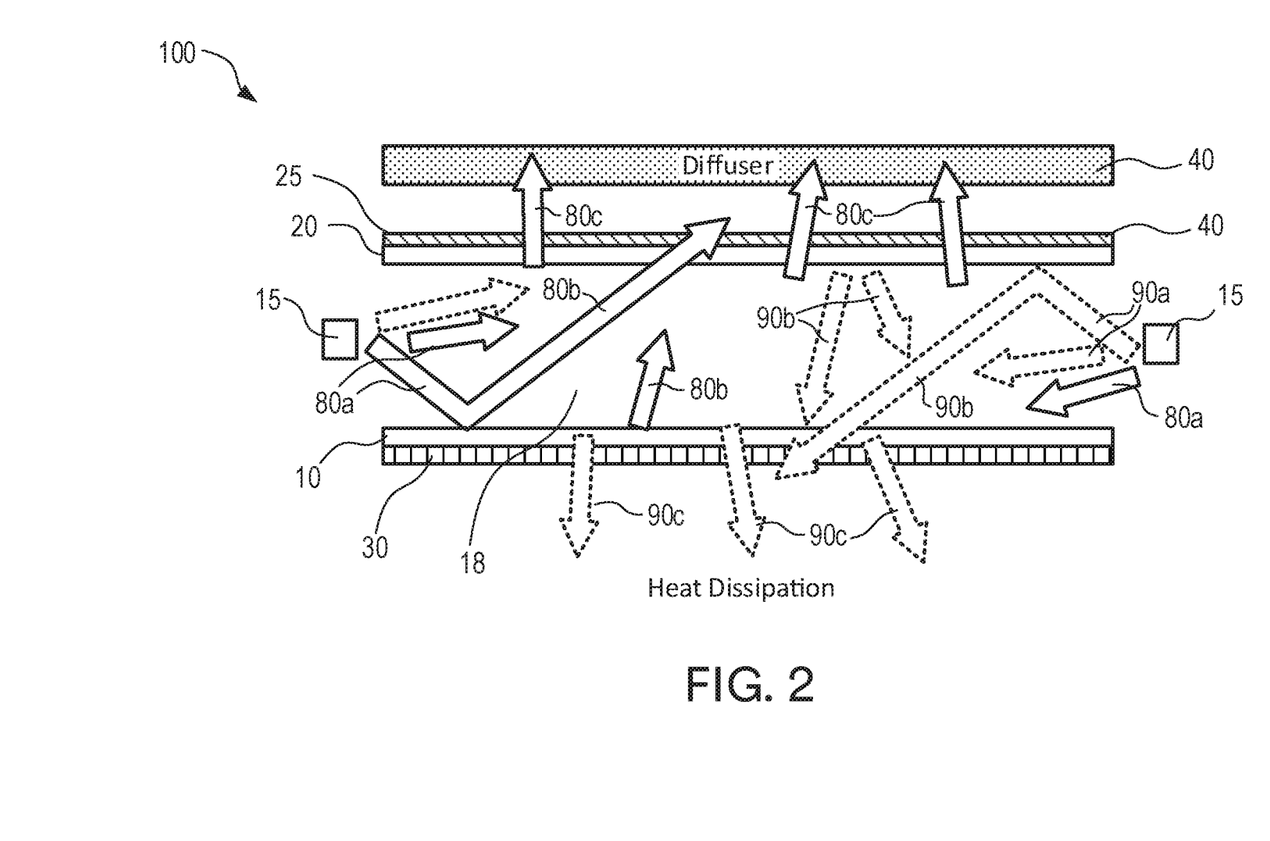
FIG. 2 is a cross-sectional view of an alternate embodiment of a thermal management system, in accordance with an embodiment described herein.

FIG. 2 is a cross-sectional view of an embodiment of the thermal management system of FIG. 1, in accordance with an alternate embodiment described herein. Many of the components shown in FIG. 2 are common with components shown in FIG. 1. These components share like reference designators and function in the same manner as like-numbered components described in FIG. 1. It should also be noted that the image-forming device 70 and enhancement layers 50a, 50b, and 60 have been removed from FIG. 2 for simplicity, but may be present in some embodiments.

Returning to FIG. 2, one or more light sources 15 may be disposed on one or more sides of an optical cavity 18. Light is emitted as human-visible light 80a and infrared energy 90a. Human-visible light 80a and infrared energy 90a enters the optical cavity 18 at various angles, and is reflected and/or transmitted appropriately by front optical reflector 20 and back optical reflector 10. For example, emitted human-visible light 80a falling incident on back optical reflector 10 is substantially reflected, becoming reflected human-visible light 80b. Reflected human-visible light 80b may then become incident on front optical reflector 20 and substantially transmitted (passed through) to become transmitted human-visible light 80c. Conversely, emitted infrared energy 90a falling incident on front optical reflector 20 is substantially reflected, becoming reflected infrared energy 90b. Reflected infrared energy 90b may then become incident on back optical reflector 10 and substantially transmitted (passed through) to become transmitted infrared energy 90c.

Stated another way, front optical reflector 20 is configured to substantially transmit (e.g., at least 70%) of human-visible light 80, and substantially reflect (e.g., at least 70%) of infrared energy 90. Conversely, back optical reflector 10 is configured to substantially transmit (e.g., at least 70%) of infrared energy 90, and substantially reflect (e.g., at least 70%) of human-visible light 80. In this manner, human-visible light 80 is substantially transmitted toward an image-forming device (not shown in FIG. 2) and infrared energy 90 is substantially transmitted away from the image-forming device and outside of optical cavity 18.

In some embodiments, a reflective polarizer 25 may be disposed on the front optical reflector 20 outside optical cavity 18. For substantially normally-incident light and for each wavelength in the first wavelength range, the reflective polarizer substantially reflects (e.g., at least 70%) light having a first polarization state, and substantially transmits (e.g., at least 70%) light having a second polarization state. In some embodiments, the reflective polarizer 25 may aid in increasing the efficiency of light transmitting through an image-forming device by changing the polarization type of the light to correspond to a type substantially transmitted by the image-forming device.

Figure 3:
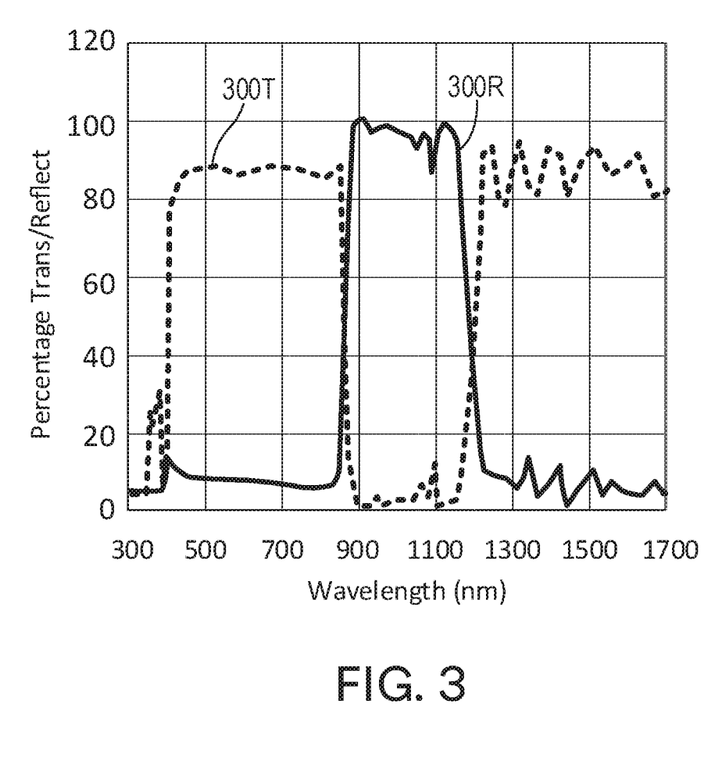
FIG. 3 is a chart plotting example transmittance and reflectance values for a specular reflector, in accordance with an embodiment described herein.

FIG. 3 is a chart plotting example transmittance and reflectance values for an embodiment of an infrared specular reflector, such as that of the front optical reflector 20 of FIGS. 1-2. Line 300T shows the transmission profile for one possible embodiment of a front optical reflector, which substantially transmits wavelengths of light between about 400 to about 870 nm, and substantially reflects wavelengths of light corresponding to infrared energy, between about 970 nm to about 1150 nm. Line 300R shows the reflectance profile for one possible embodiment of a front optical reflector, substantially reflecting wavelengths of light between about 850 nm and about 1200 nm. The chart of FIG. 3 shows example transmission and reflectance profiles for one possible embodiment of a front optical reflector for illustrative purposes, and is not limiting. The transmission profile 300T shows an example bandpass region for human-visible light, or a subset thereof, with average transmission values of at least about 60%, or at least about 70%, or at least about 80%. Similarly, the reflectance profile 300R shows an example of a reflecting region for infrared energy, or a subset thereof, with average reflectance values of at least about 60%, or at least about 70%, or at least about 80%.

Figure 4:
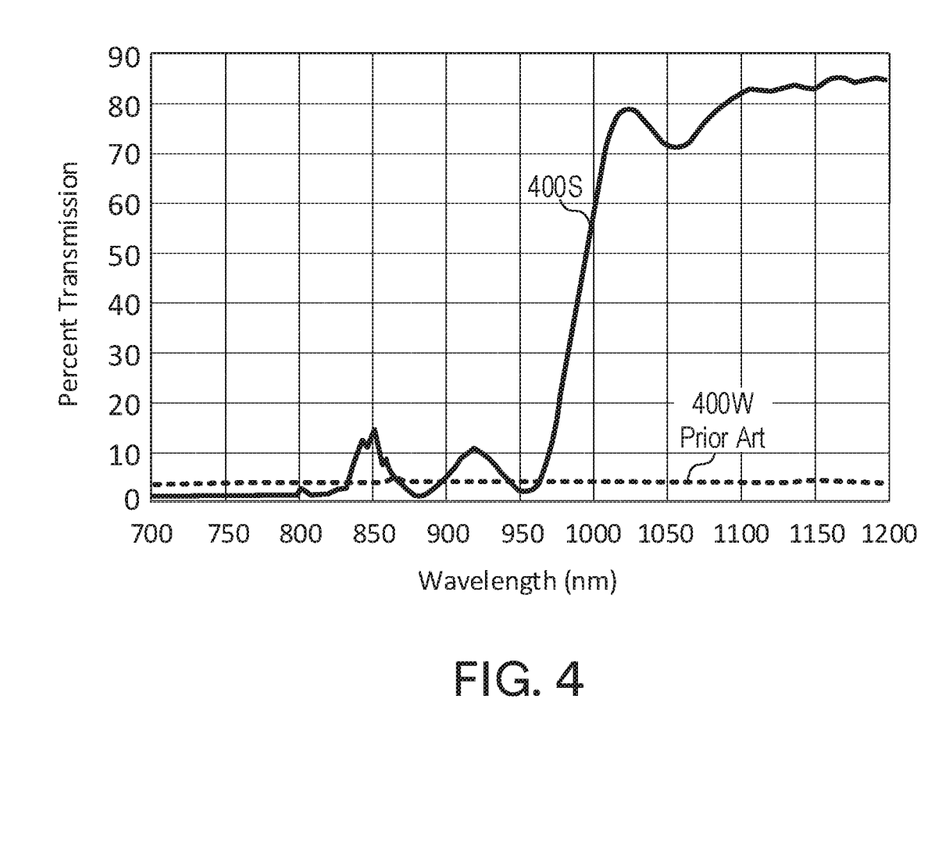
FIG. 4 is a chart comparing transmittance curves for a typical white reflector of the prior art against that of a specular reflector, in accordance with an embodiment described herein.

Finally, FIG. 4 is a chart comparing transmittance curves for a typical white reflector of the prior art against that of a visible-light specular reflector, such as that of the back optical reflector 10 of FIGS. 1-2. Line 400W shows the percent transmission of wavelengths of light from about 700 nm to about 1200 nm for a typical white light reflector seen in the prior art. For a typical white light reflector 400W, less than about 5% of all the wavelengths in this range are transmitted (i.e., allowed to pass through the reflector), and thus are substantially reflected back into the optical cavity of the backlight. When combined with an infrared-reflecting front optical reflector, a white light reflector would trap infrared energy inside the optical cavity, creating unwanted heating of the system. Line 400S shows the percent transmission of wavelengths of light for the same range (about 700 nm to about 1200 nm) for an embodiment of a visible-light reflector, such as the that of the back optical reflector 10 of FIGS. 1-2. Wavelengths of light for profile 400S between about 700 nm and about 1000 nm are substantially reflected (i.e., not transmitted through the reflector), and wavelengths between about 1000 nm and about 1200 nm are substantially transmitted. The chart of FIG. 4 shows the transmission profiles for one embodiment of a back optical reflector in accordance with an embodiment described herein, and is not limiting. The transmission profiles shown here are examples only for illustrative purposes.

As described elsewhere herein, blue light sources (e.g., blue LEDs) may be used as the source of light for higher color gamut displays. In this case, a spectral reflector film could be used that allows the blue light to pass and reflect the infrared prior to the diffuser and a color conversion film, such as a film layer containing quantum dots or phosphor sheets. Other variants and embodiments of the front and back optical reflectors are possible without deviating from the described embodiments.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A backlight for providing illumination to an image forming device, the backlight comprising:

spaced apart front and back optical reflectors defining an optical cavity therebetween, the front optical reflector configured to be disposed between the image forming device and the back optical reflector, wherein the optical cavity is substantially a solid volume comprising opposing top and bottom major surfaces, the front optical reflector disposed on the top major surface, and the back optical reflector disposed on the bottom major surface;

such that for substantially normally incident light and for each of orthogonal first and second polarization states and for nonoverlapping first and second wavelength ranges:

the front optical reflector transmits at least 60% of light for each wavelength in the first wavelength range, and reflects at least 70% of light for each wavelength in the second wavelength range; and the back optical reflector reflects at least 70% of light for each wavelength in the first wavelength range, and transmits at least 70% of light for each wavelength in the second wavelength range; and at least one light source for emitting light into the optical cavity, the emitted light having at least one wavelength in the first wavelength range and at least one wavelength in the second wavelength range.

2. The backlight of claim 1, wherein the front optical reflector transmits at least 70% of light for each wavelength in the first wavelength range.

3. The backlight of claim 1, wherein each of the front and back optical reflectors comprises a plurality of polymeric layers.

4. The backlight of claim 1, wherein each of the front and back optical reflectors comprises a band edge separating the first wavelength range from the second wavelength range, the band edges being within 50 nm of each other.

5. The backlight of claim 1, wherein the first wavelength range extends from about 400 nm to about 700 nm.

6. The backlight of claim 1, wherein the second wavelength range extends from about 700 nm to at least about 1.7 microns.

7. The backlight of claim 1, wherein the front optical reflector comprises a plurality of alternating first and second polymeric layers numbering between 50 and 1000, each first and second polymeric layers having an average thickness less than about 500 nm, for each pair of adjacent first and second polymeric layers:

in planes of the first and second polymeric layers, the first and second polymeric layers have respective indices of refraction: $nx1$ and $nx2$ along the first polarization state, $ny1$ and $ny2$ along the second polarization state, and $nz1$ and $nz2$ along a z-axis orthogonal to the first and second polarization states, such that for at least one wavelength in the first wavelength range:

$nx1$ is between about 1.60 and about 1.70,
$ny1$ is between about 1.60 and about 1.70,
$nz1$ is between about 1.45 and about 1.55,
$nx2$ is between about 1.45 and about 1.55,
$ny2$ is between about 1.45 and about 1.55, and
$nz2$ is between about 1.45 and about 1.55.

8. The backlight of claim 1 further comprising a reflective polarizer disposed on the front optical reflector outside the optical cavity, such that for substantially normally incident light and for each wavelength in the first wavelength range, the reflective polarizer reflects at least 70% of light having the first polarization state and transmits at least 70% of light having the second polarization state.

9. The backlight of claim 1 further comprising an optical diffuser disposed on the front optical reflector outside the optical cavity, the optical diffuser diffusing light exiting the optical cavity though the front optical reflector.

10. The backlight of claim 1, wherein the optical cavity is a substantially hollow air-filled cavity.

11. The backlight of claim 1, further comprising a thermal management layer disposed on the back optical reflector outside the optical cavity for absorbing at least 50% of light having a wavelength in the second wavelength range and transmitted by the back optical reflector.

12. The backlight of claim 11, wherein the thermal management layer absorbs at least a portion of light having at least one wavelength greater than wavelengths in the second wavelength range.

13. The backlight of claim 12, wherein the at least one wavelength comprises a third wavelength range comprising wavelengths greater than wavelengths in the second wavelength range.

14. The backlight of claim 13, wherein the third wavelength range is at least about 200 nm wide.

15. The backlight of claim 13, wherein the back optical reflector transmits at least 10% of at least one wavelength in the third wavelength range.

16. The backlight of claim 11, wherein the thermal management layer comprises a thermally conductive layer.

17. The backlight of claim 11, wherein the thermal management layer comprises an infrared absorptive layer.

18. The backlight of claim 11, wherein the thermal management layer comprises a thermally conductive layer disposed adjacent an infrared absorptive layer, the thermally conductive layer for conducting heat generated as a result of infrared light absorbed by the infrared absorptive layer.

19. A display system comprising:

the backlight of claim 1; and the image forming device disposed on the front optical reflector outside the optical cavity, such that light emitted by the at least one light source illuminates the image forming device after exiting the optical cavity though the front optical reflector.

* * * * *